(12) United States Patent
Takeda et al.

(10) Patent No.: US 6,234,767 B1
(45) Date of Patent: May 22, 2001

(54) ROTOR HAVING PERMANENT MAGNET AND MECHANISM FOR COOLING THE SAME

(75) Inventors: Masanobu Takeda; Yasumasa Mizuno, both of Saitama-Pref (JP)

(73) Assignee: Denyo Co., Lmtd., Tokyo (JP)

( * ) Notice: Subject to any disclaimer, the term of this patent is extended or adjusted under 35 U.S.C. 154(b) by 0 days.

(21) Appl. No.: 09/164,370

(22) Filed: Oct. 1, 1998

(30) Foreign Application Priority Data

Oct. 1, 1997 (JP) .................................................. 9-269047
Oct. 1, 1997 (JP) .................................................. 9-269048

(51) Int. Cl.$^7$ ............................. F04B 17/00; H02K 21/12
(52) U.S. Cl. ............................. 417/355; 417/366; 310/156
(58) Field of Search .................................... 417/355, 368, 417/366; 310/58, 156, 214, 241

(56) References Cited

U.S. PATENT DOCUMENTS

| | | | | |
|---|---|---|---|---|
| 5,811,904 | * | 9/1998 | Tajima et al. ........................ | 310/156 |
| 5,825,108 | * | 9/1998 | De Fillippis ....................... | 310/67 R |
| 5,828,152 | * | 10/1998 | Takeda et al. ........................ | 310/156 |
| 5,898,990 | * | 5/1999 | Henry ..................................... | 29/598 |

FOREIGN PATENT DOCUMENTS 8-107639   4/1996   (JP) .

* cited by examiner

Primary Examiner—Henry C. Yuen
Assistant Examiner—Mahmoud M Gimie
(74) Attorney, Agent, or Firm—Liniak, Berenato, Longacre & White

(57) ABSTRACT

A laminating a plurality of permanent magnets embedded in storage pores, characterized in that each permanent magnet is inserted in each of said storage pore so as to form gaps at the both ends of the storage pore of the field core, thereby to form air paths for cooling air and a mechanism for cooling such a rotor having permanent magnets characterized by forming air paths for cooling air by providing gaps between each of the inner surface of the end plate and the outer surface of the field core, and also forming air paths for cooling air by placing air paths in the axis direction in contact with each of the permanent magnets on both ends of the permanent magnet, and placing an inlet and an outlet of the cooling air on each of said air paths in such a manner that the cooling air enters one end plate and exits the other end plate via each of said air paths are disclosed.

8 Claims, 16 Drawing Sheets

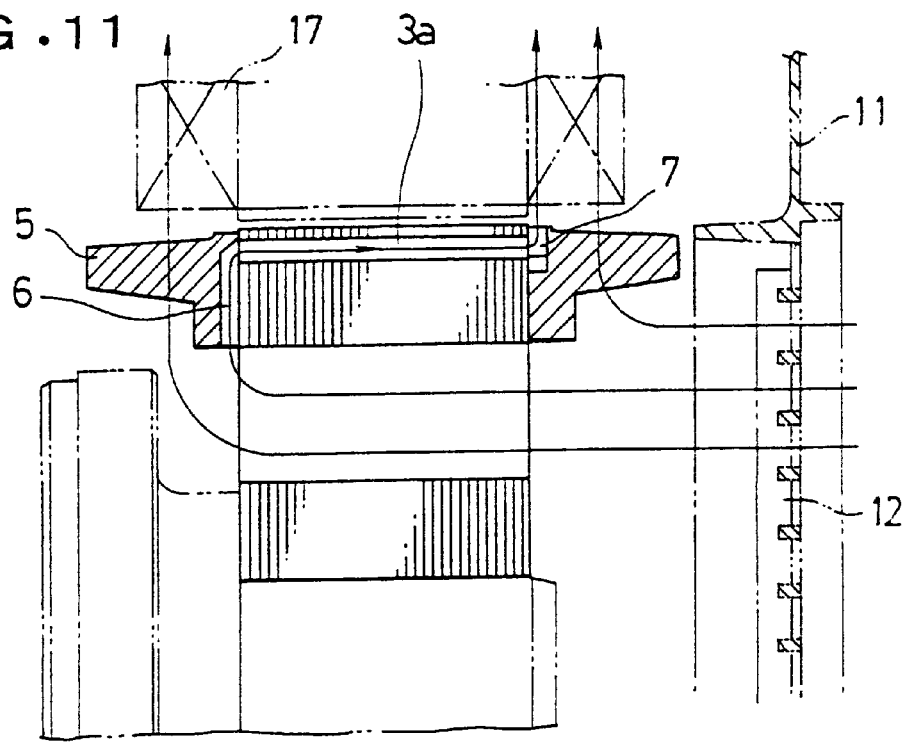
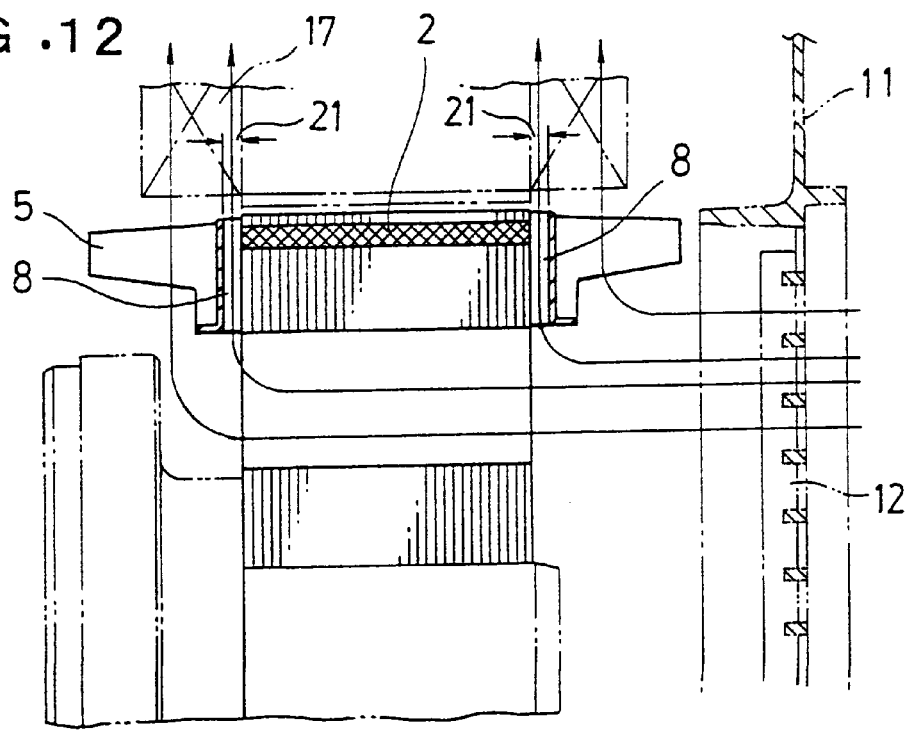

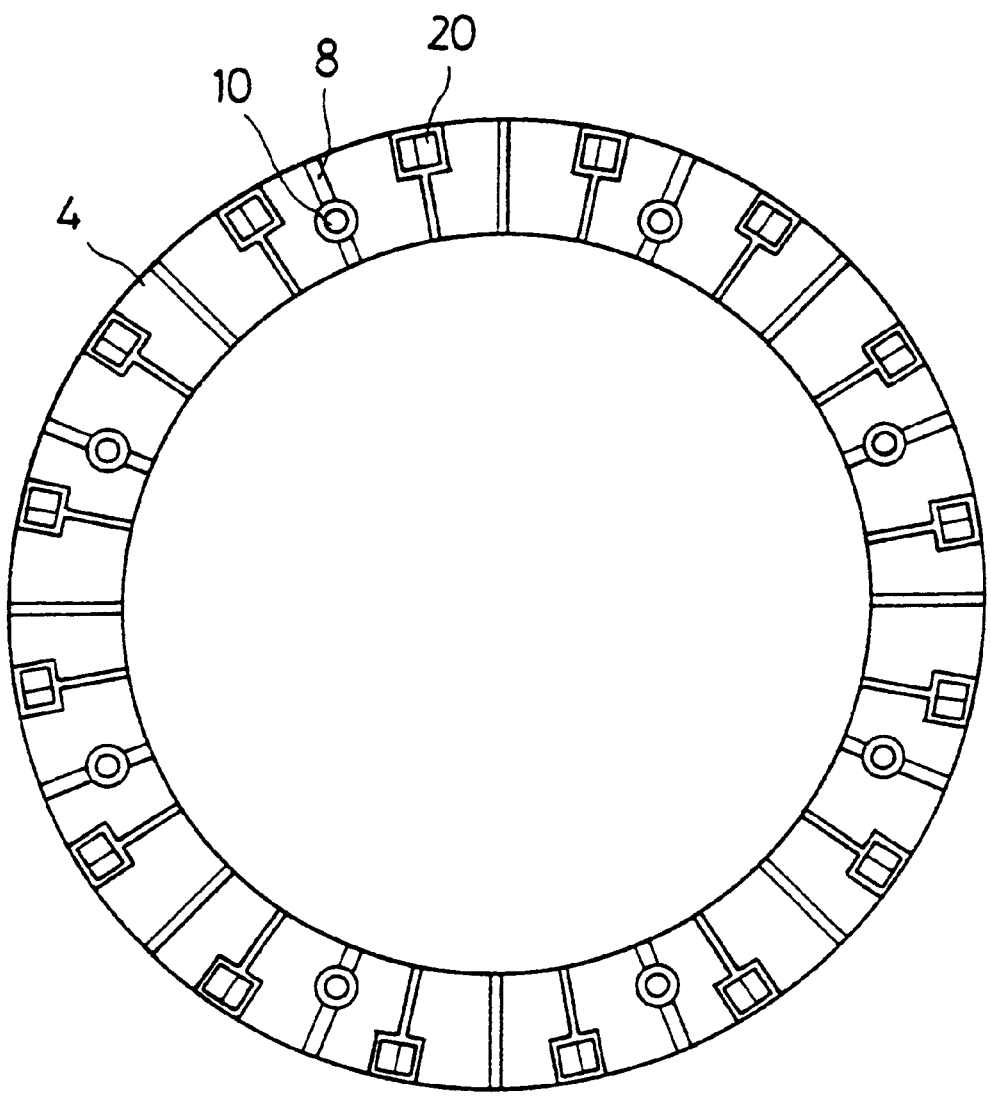
F I G. 17

ROTOR HAVING PERMANENT MAGNET AND MECHANISM FOR COOLING THE SAME

BACKGROUND OF THE INVENTION

1. Field of the Invention

The present invention relates to a rotor having permanent magnets and mechanism for cooling the same. More particularly, the invention relates to a rotor having a plurality of permanent magnets embedded in adjacent to a field core of the rotor for, e.g., a power generator, and a construction for cooling such a rotor.

2. Prior Art

A rotor has been known, e.g., from Japanese Patent Laid-Open No. 8-107639, which comprises providing spaces for embedding permanent magnets at the position in adjacent to the outer circumference, laminating field core pieces, and embedding the permanent magnets. However, such a rotor having gaps provided cannot sufficiently prevent the leakage of the magnetic flux of magnetic circuit. Due to the radiation heat from the armature, which increases the temperatures of the field core and/or permanent magnets embedded into the field core and due to insufficient cooling of the permanent magnets, sufficient output cannot be obtained in the case of the rotor having a large output. In such a rotor, with the operation of the power generator, the field core is heated by the radiation heat from the armature, such an increase in the temperature of permanent magnets also decrease in output of the power generator.

In the case of embedding permanent magnets in to field core in such a conventional rotor, the whole size of rotor becomes large, the magnet flux is frequently leaked and, thus, the output of the power generator is decreased. Furthermore, due to the radiation from the armature, the temperatures of the field core and the permanent magnet embedded therein are increased. Due to insufficient cooling of the field core and, in particular of the permanent magnet, the decrease in the output due to the heat cannot be avoided Moreover, such a rotor also is disadvantageous in that the cooling air within the field core insufficiently flows, leading to a reduced cooling efficiency and, thus, increase in the output of the power generator cannot be expected.

As shown in FIGS. 19A and 19B, we have developed a lamination of the armature core for a rotating field core type power generator and filed as Japanese Patent Application No. 9-269046. The lamination construction of an armature sheets according to this application is a lamination ($D_1$–$D_n$) of the armature sheets G in which the armature core sheets has a circular shape in order to store a field core of the power generator within the armature, which can revolves within the armature core, each armature is formed by punching plurality of V-shaped or trapezoid caulking portions K on the outer circumference, characterized in that V-shape or trapezoid caulking portions K are formed by punching the portions in adjacent to the teeth portions B projected on the inner circumference of the armature core D residing on the radial line from the axis O of the field core, and at the same time, when the armature sheets D are laminated to be a laminate construction ($D_1$–$D_n$), said caulking portions K are fitted to tightly communicate the armature sheets D. (1) When the field core revolves at high speed within the armature, the teeth portions have an influence upon magnetic flux which frequently changes, resulting in vibration. The vibration due to the influence of the magnetic flux causes the magnetic route formed on the teeth portions to be irregular. Since V-shape or trapezoid caulking portions K are formed by punching the portions in adjacent to the teeth portions B, the loss of the magnetism caused by the irregular magnetic route can be prevented. Consequently, (2) uncomfortable feeling can be avoided and, at the same time, noise can be reduced. (2) When the length of the caulking portions K are punched along the radial line not shown from the axis of the field core, the magnetic route becomes uniform. Consequently, the loss of the magnetism can be prevented.

SUMMARY OF THE INVENTION

An object of the present invention is to provide a rotor for a power generator having permanent magnets which has a simple and a small-sized construction, can reduce the leakage of magnetic flux, suppress an increase in the temperature of the filed core and permanent magnets, and has a large amount of output.

Another object of the present invention is to provide a cooling mechanism for cooling a rotor having permanent magnets which can effectively cool the field core and permanent magnets whereby a decrease in output of the power generator due to an increase in their temperature can be suppressed as little as possible, so as to improve a decrease in the output of the power generator due to an increase in the temperature of the field core making up the rotor or the permanent magnets embedded therein by the radiation heat from the winding of the armature as seen in the prior art.

According to the first aspect of the present invention, there is provided a rotor having permanent magnets formed by laminating a plurality of permanent magnets embedded in storage pores, characterized in that each permanent magnet is inserted in each of said storage pore so as to form gaps at the both ends of the storage pore of the field core, thereby to form air paths for cooling air.

In the first aspect of the present invention, it is preferable that said storage pores formed in adjacent to the outer frame is formed as long pores, rectangle permanent magnets are embedded into each of the pores at the center portion thereof, and means for positioning the permanent magnets are placed in the gaps formed on the both ends of each pores.

Further, it is also preferable in the first aspect of the present invention that said means for positioning the permanent magnet is formed so that both ends thereof are longer than the middle portion to place difference in shape of the storage pores.

Moreover, it is also preferable in the first aspect of the present invention that said means for positioning the permanent magnet position the permanent magnet is formed by embedding a non-magnetic substance into part of the gaps.

According to the second aspect of the present invention there provided a mechanism for cooling a rotor having permanent magnets formed by laminating a plurality of field core sheets to form a field core, embedding a plurality of permanent magnets into the field core, and fixing the field core by means of a pair of end plates having a plurality of wings on the outer surface thereof so as to generate the flow of cooling air toward the armature winding, characterized by forming air paths for cooling air by providing gaps between each of the inner surface of the end plate and the outer surface of the field core, and also forming air paths for cooling air by placing air paths in the axis direction in contact with each of the permanent magnets on both ends of the permanent magnet, and placing an inlet and an outlet of the cooling air on each of said air paths in such a manner that the cooling air enters one end plate and exits the other end plate via each of said air paths.

In the second aspect of the present invention, it is preferable that concave grooves each having an air inlet in which an outer frame side is closed and an axis core side is opened, and concave portions each having an air outlet in which an axis core side is closed and an outer frame side is opened are alternatively placed on the inner surface of the outer edge of the end plates, a concave portion on one end plate is position opposite to a concave groove on the other end plate so as to clamp the said field core and, at the same time, the air paths formed on both ends of the permanent magnets perforated into the field core is fixed by said pair of the end plates on both sides of the field core opposite to the concave portion and the concave groove of the said pair of the end plates, and according to the rotation of the rotor, by means of a fan effect caused by the outside wing, the projected portions around said concave grooves and the projected portions around said concave portions formed radially, the cooling air is spouted through the gaps formed between the inner surface of the end plate and the outer surface of the field core and, at the same time, the cooling air is inflated from said concave groove, then it passes through the air paths, and is spouted at the concave portion opposite to the corresponding concave groove.

Also, it is preferable in the second aspect of the present invention that a plurality of dividing walls are provided on the portions between the concave grooves and the concave portions or the inlets of the end plates in such a manner that the height of the dividing wall is the same as the neighboring projections of the concave grooves and concave portions so that when the pair of the end plates clamp both sides of the field core, gaps are formed between the end plates and the outside of the field core in contact with the end plate, whereby the cooling air is spouted from the gaps according to the rotation of the rotor.

According to the third aspect of the present invention, there provided a mechanism for cooling a rotor having permanent magnets formed by laminating a plurality of field core sheets to form a field core, embedding a plurality of permanent magnets into the field core, and fixing the field core by means of a pair of end plates having a plurality of wings on the outer surface thereof so as to generate the flow of cooling air toward the armature winding, characterized by providing baffles on the outer frame of the plurality of wings projected on the outer surface of the pair of end plates at an equivalent interval, in such a manner that the baffle on one end plate is provided in the direction of the rotation and the baffle on the other end plate is provided in the direction opposite to the rotation, providing air paths in adjacent to the baffle on the axis side in such a manner that the positions of said air paths are accorded with the air paths residing on both ends of the pores into which the permanent magnet is embedded, whereby the cooling air inflated from the air paths on the axis core side is passed through the air paths at both ends of the permanent magnet by means of the baffle of the edge extending to the direction of the rotation according to the rotation of the rotor and flows to the opposite ventilator to cool the field core and the permanent magnet.

BRIEF DESCRIPTION OF THE DRAWINGS

FIG. 8 is a cross-sectional view of the end plate of FIG. 7, wherein FIG. 8B is a cross-sectional view taken along the line H—H;

FIGS. 11 and 12 are an enlarged cross-sectional view of the rotor having permanent magnets of FIG. 1 taken along the line D—D of FIG. 1;

FIG. 17 is an internal view of FIG. 16;

DESCRIPTION OF THE PREFERRED EMBODIMENT

Figure 1:
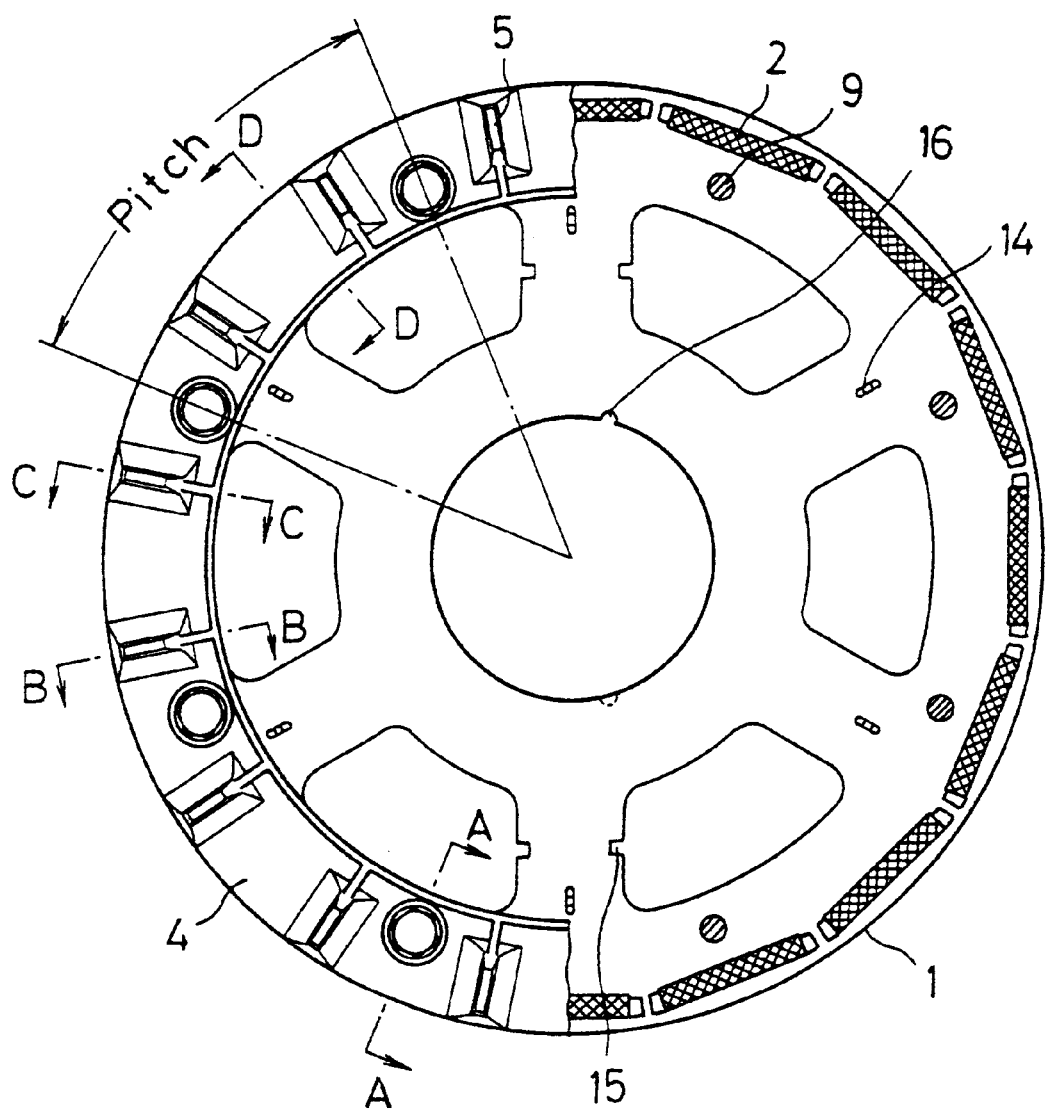
FIG. 1 is a partially cross-sectional side view of a rotor having permanent magnets according to the present invention.

The present invention will now be described by referring to the drawings.

Figure 2:
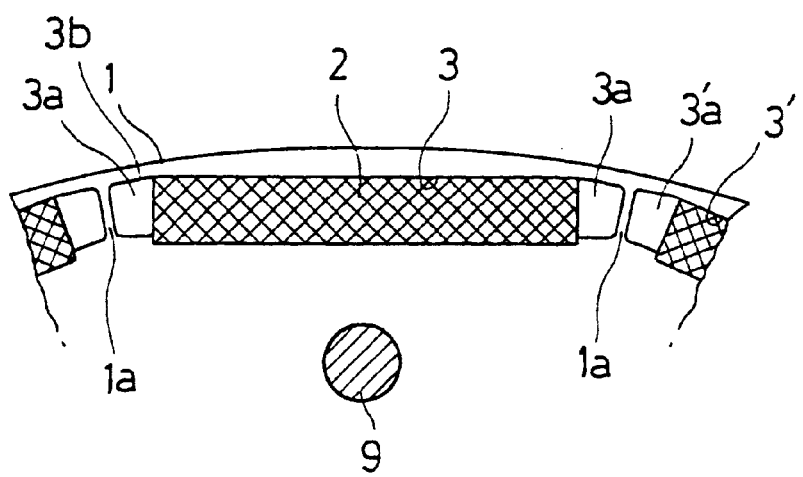
FIG. 2 is a partially enlarged side view showing the outer frame of the field core for use in a rotor having permanent magnets according to the present invention.
Figure 3:
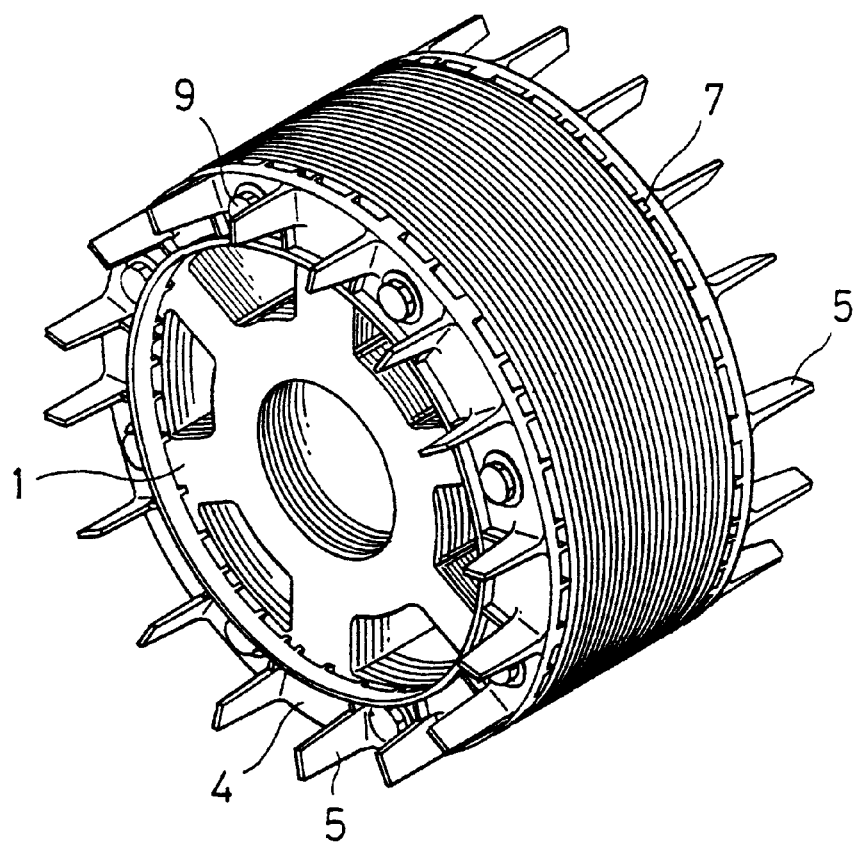
FIG. 3 is a perspective view of a rotor having permanent magnets according to the present invention.
Figure 4:
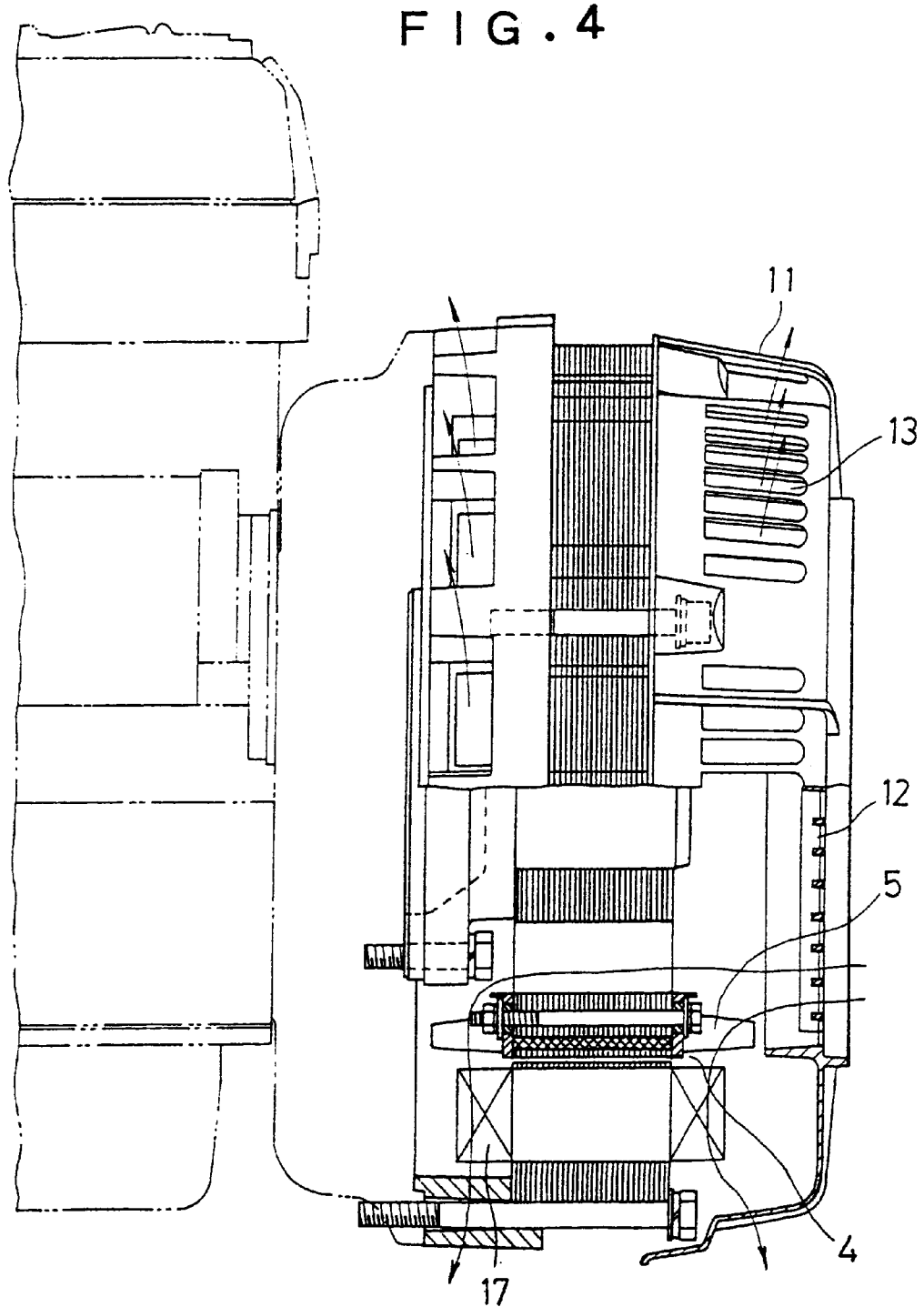
FIG. 4 is a partially cross-sectional side view of a power generator having a rotor having permanent magnets according to the present invention accommodated therein, wherein the arrows n this Figure show the flow of air.
Figure 5:
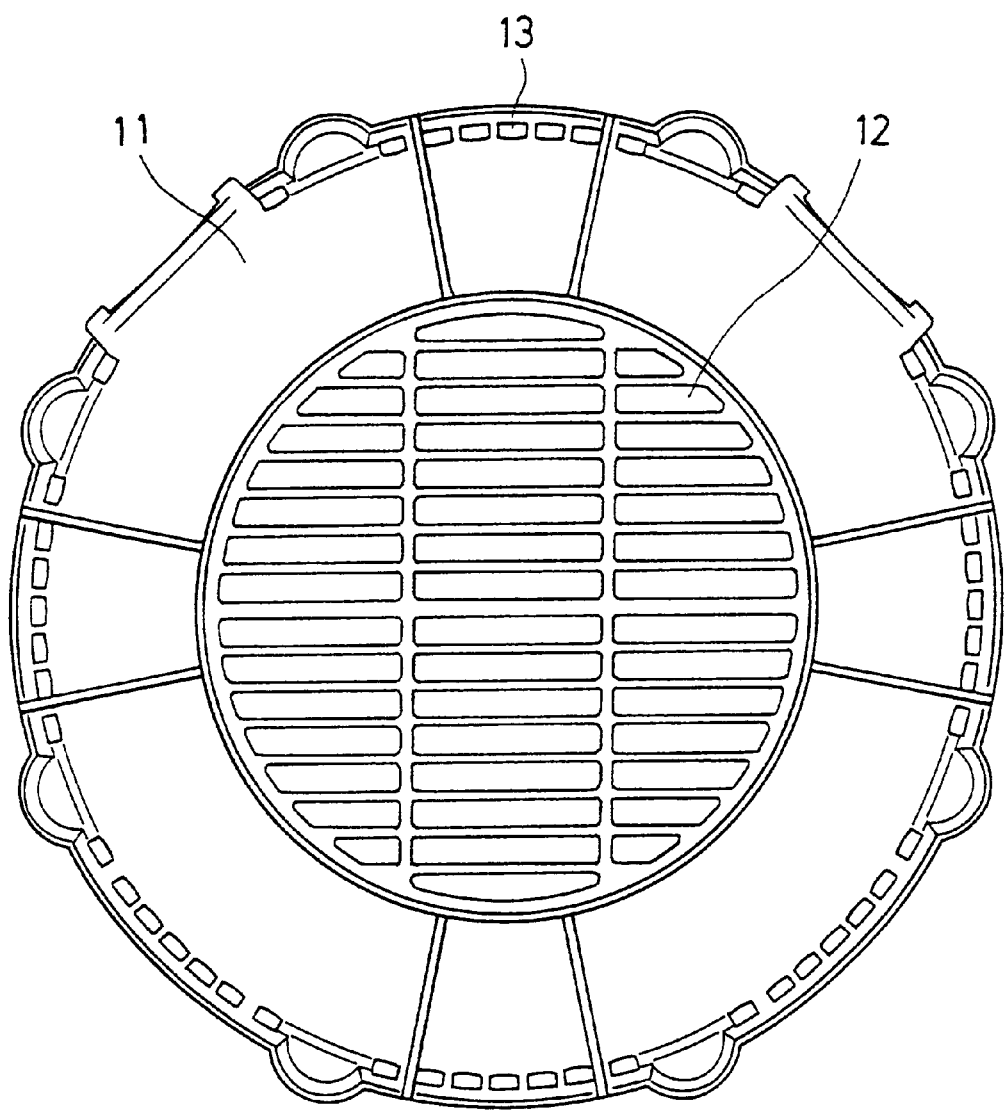
FIG. 5 is a front view of FIG. 4.
Figure 6:
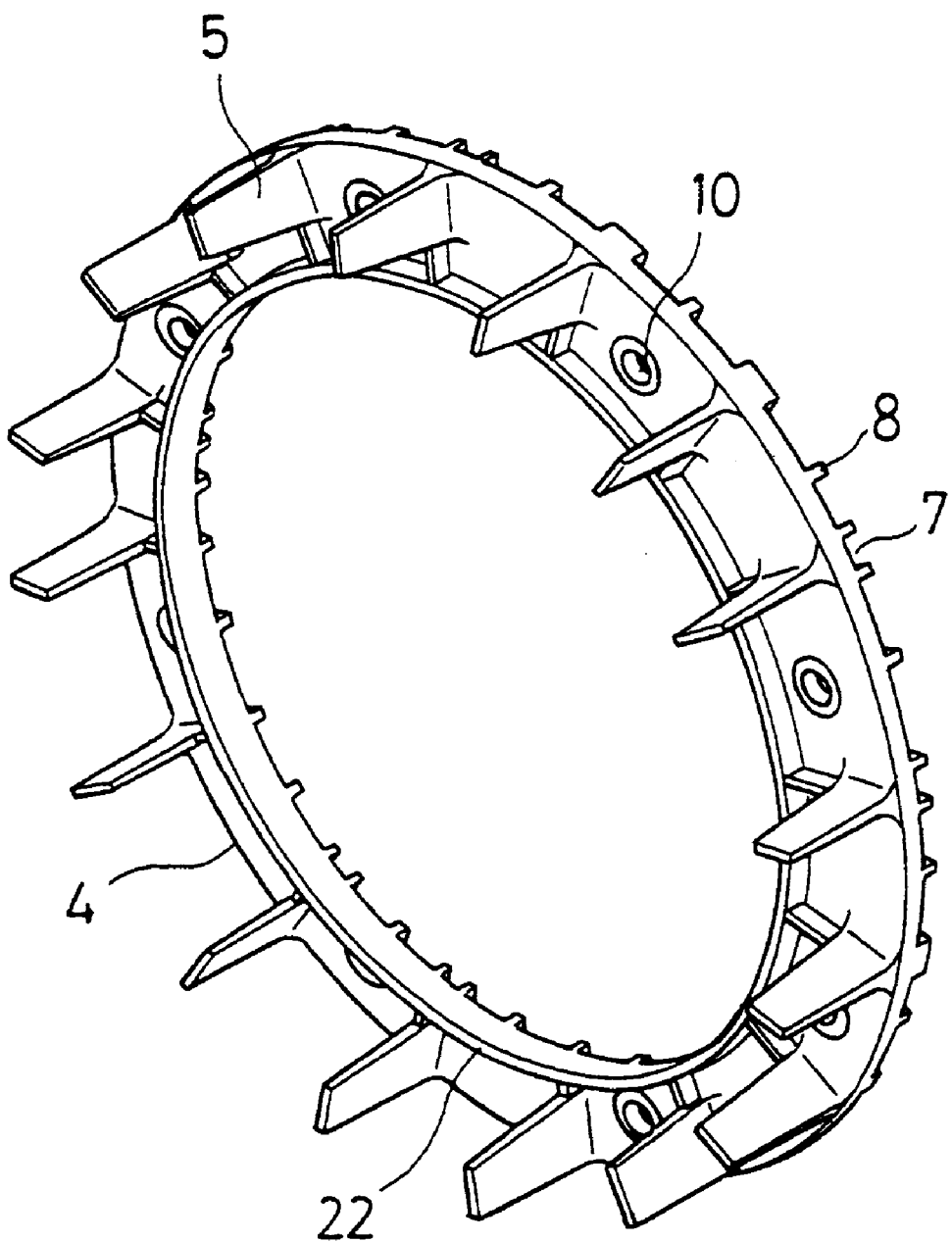
FIG. 6 is a perspective view of an end plate of the rotor having permanent magnets according to the present invention.
Figure 7:
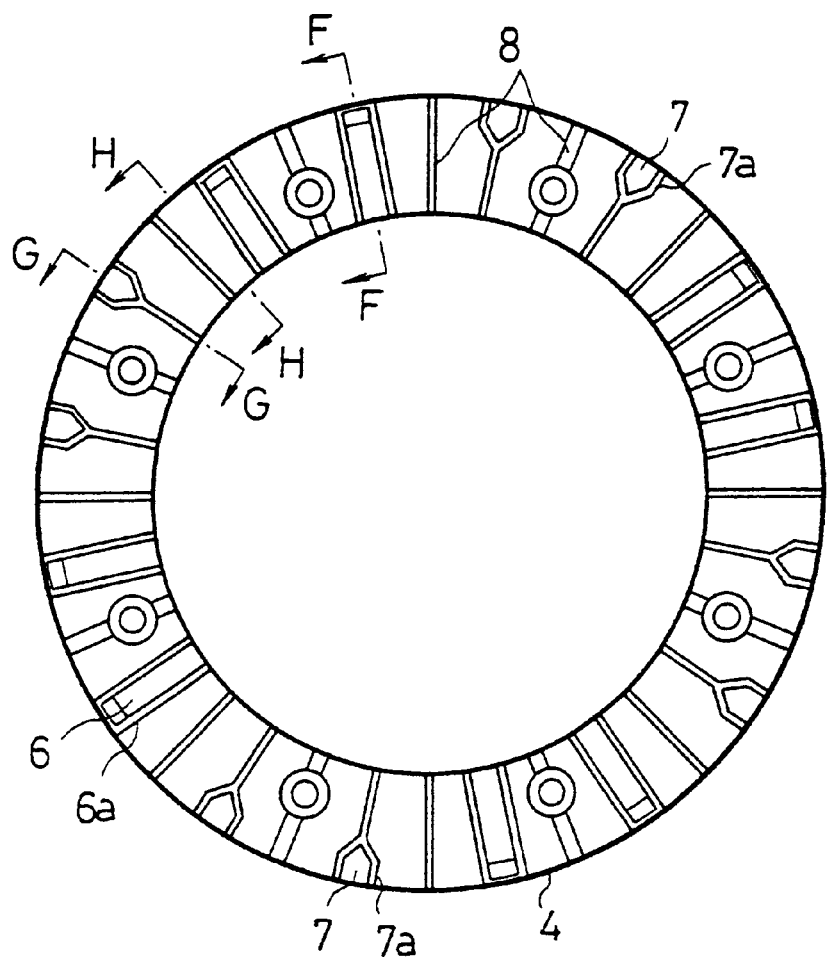
FIG. 7 is a plane view of the inside of the end plate of FIG. 6.
Figures 8A, 8B, 8C:
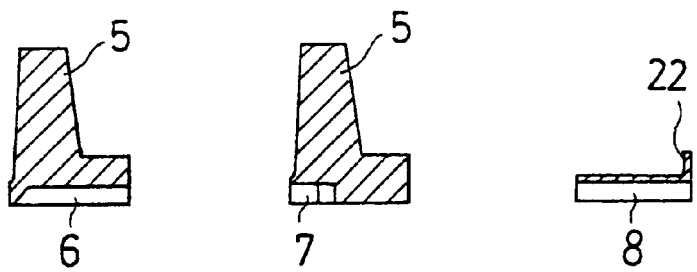
FIG. 8A is a cross-sectional view taken along the line F—F.
FIG. 8B is a cross-sectional view taken along the line G—G.
Figure 9:
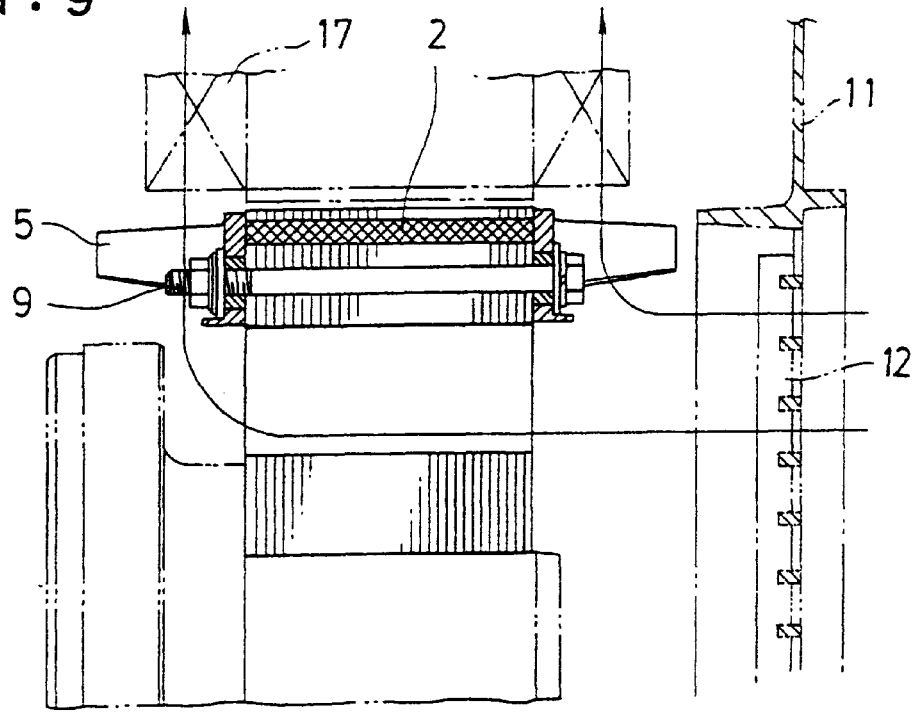
FIG. 9 is an enlarged cross-sectional view of the rotor having permanent magnets according to the present invention shown in FIG. 1 taken along the line A—A of FIG. 1.
Figure 10:
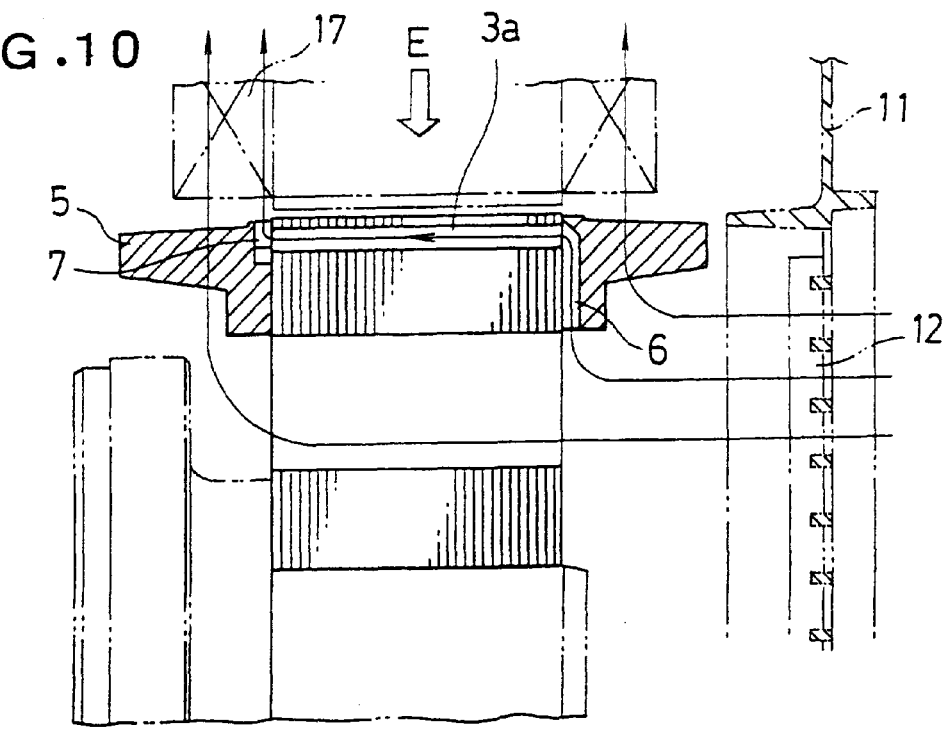
FIG. 10 is an enlarged cross-sectional view of the rotor having permanent magnets of FIG. 1 taken along the line C—C of FIG. 1.
Figure 13A:
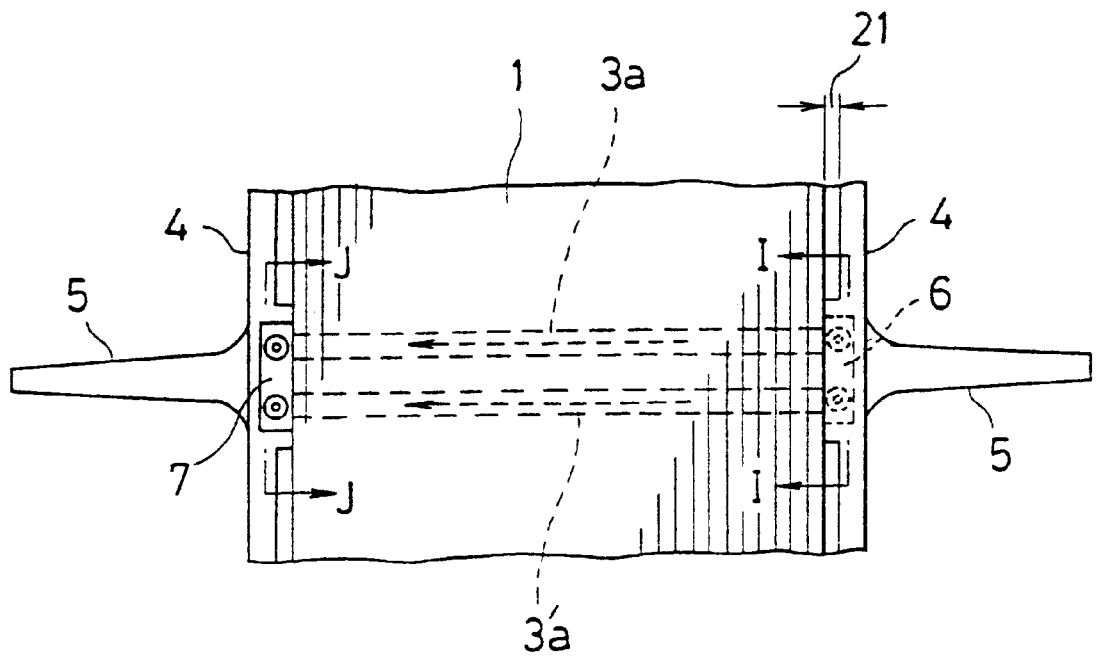
FIG. 13A is an enlarged view shown from the line E.
Figures 13B, 13C:
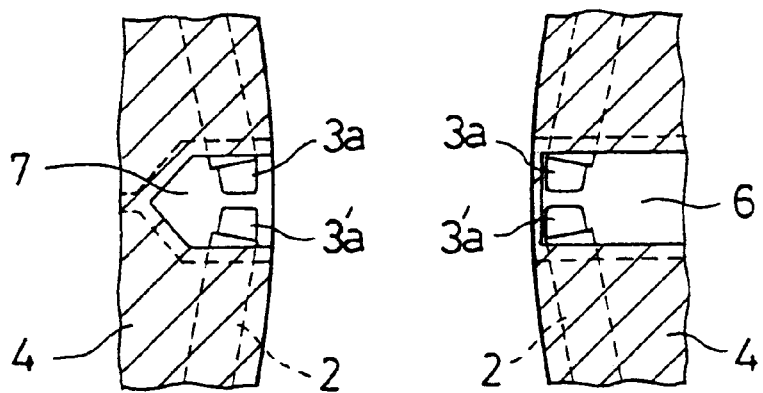
FIG. 13B is a cross-sectional view of FIG. 13A taken along the line I—I.
FIG. 13C is a cross-sectional view of FIG. 13A taken along the line J—J.
Figure 14:
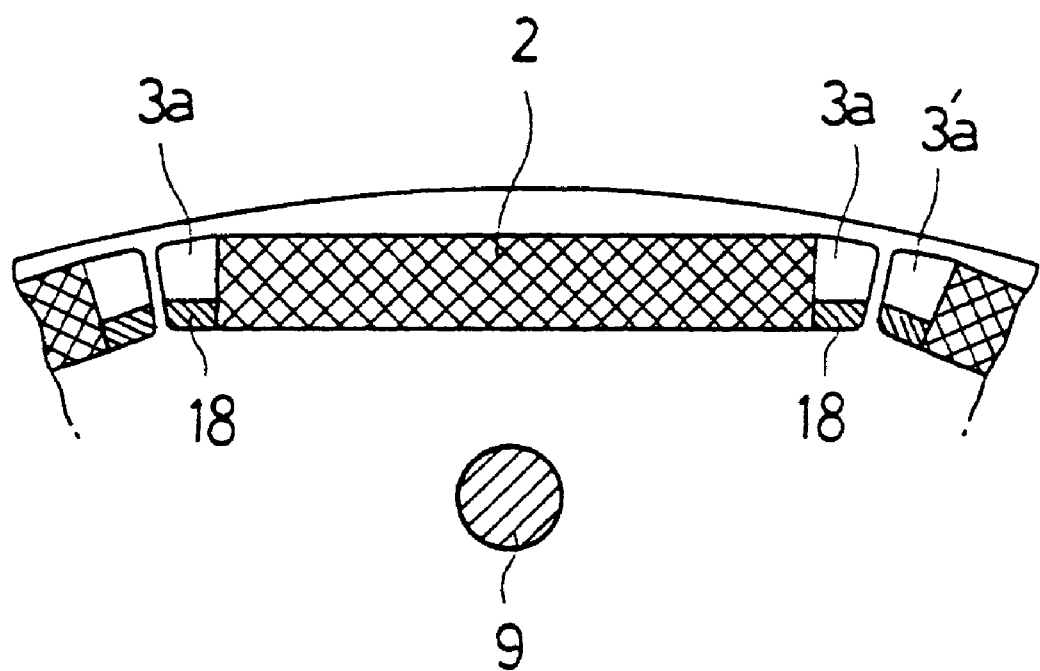
FIG. 14 is a partially enlarged plane view of the field core for use in the present invention having a non-magnetic substance inserted therein as means for positioning the permanent magnet.
Figure 15:
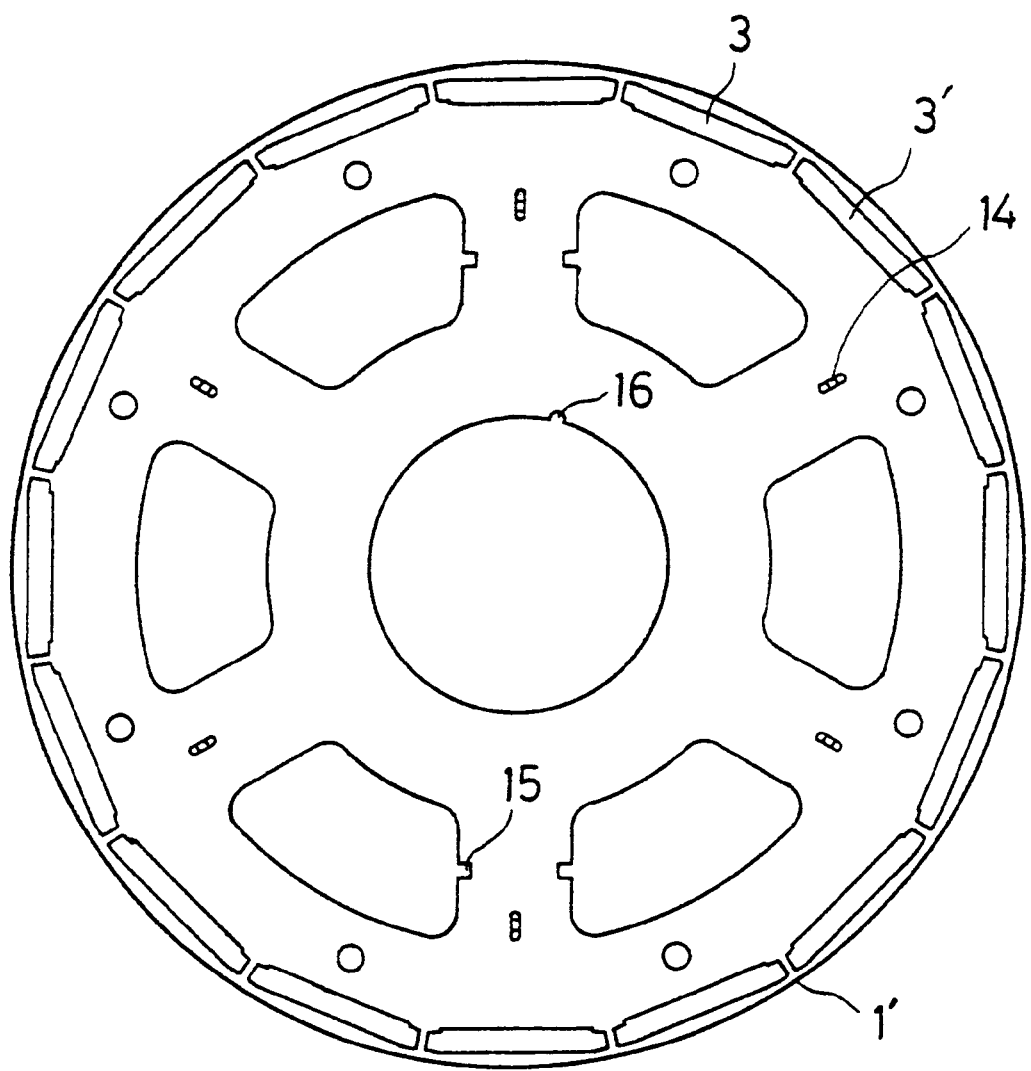
FIG. 15 is a plane view of field core sheet for use in the rotor having permanent magnets according to the present invention.
Figure 16:
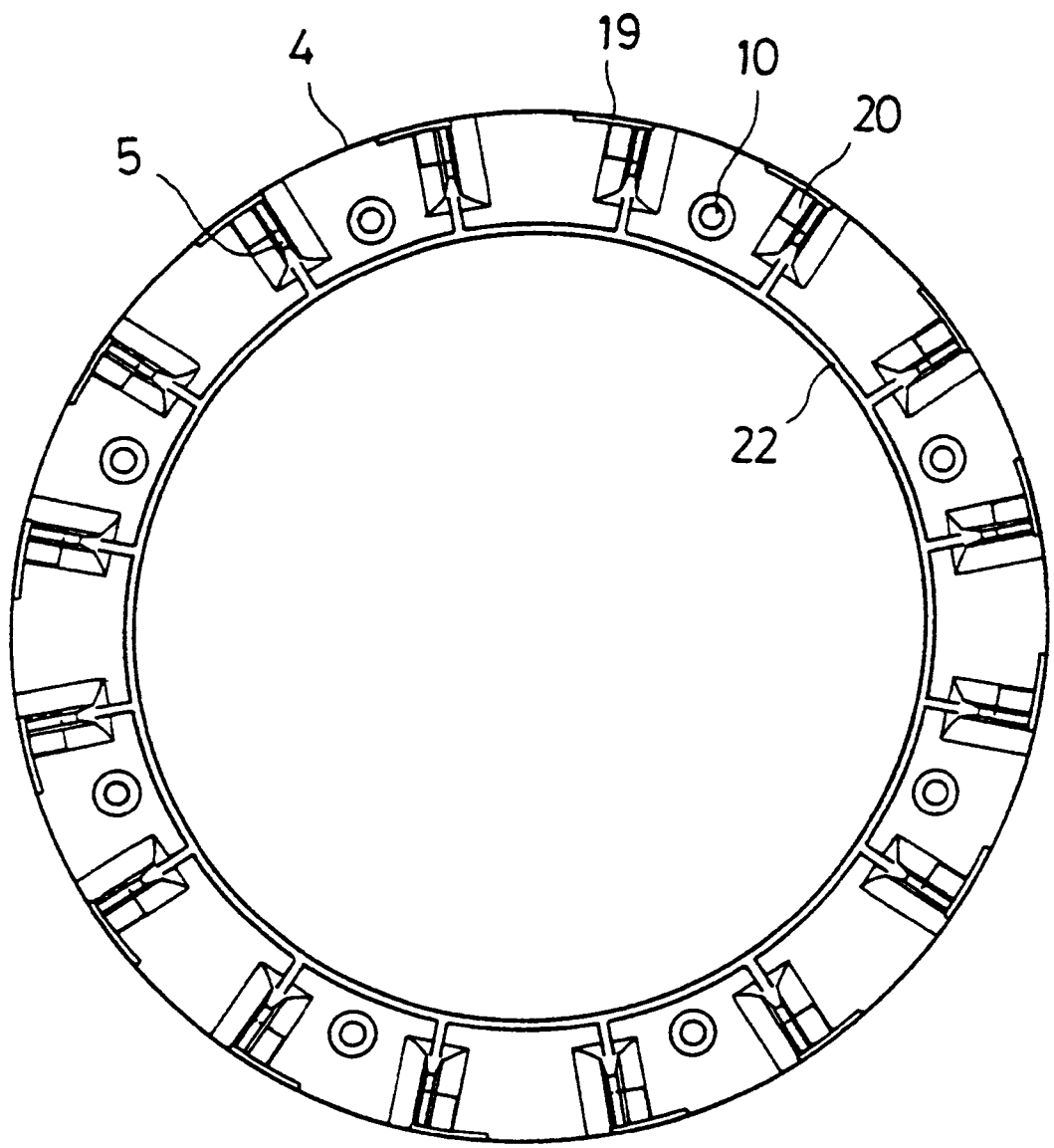
FIG. 16 is an external side view of an end plate for use in the rotor having permanent magnets according to the present invention having a baffle provided thereon.
Figure 18:
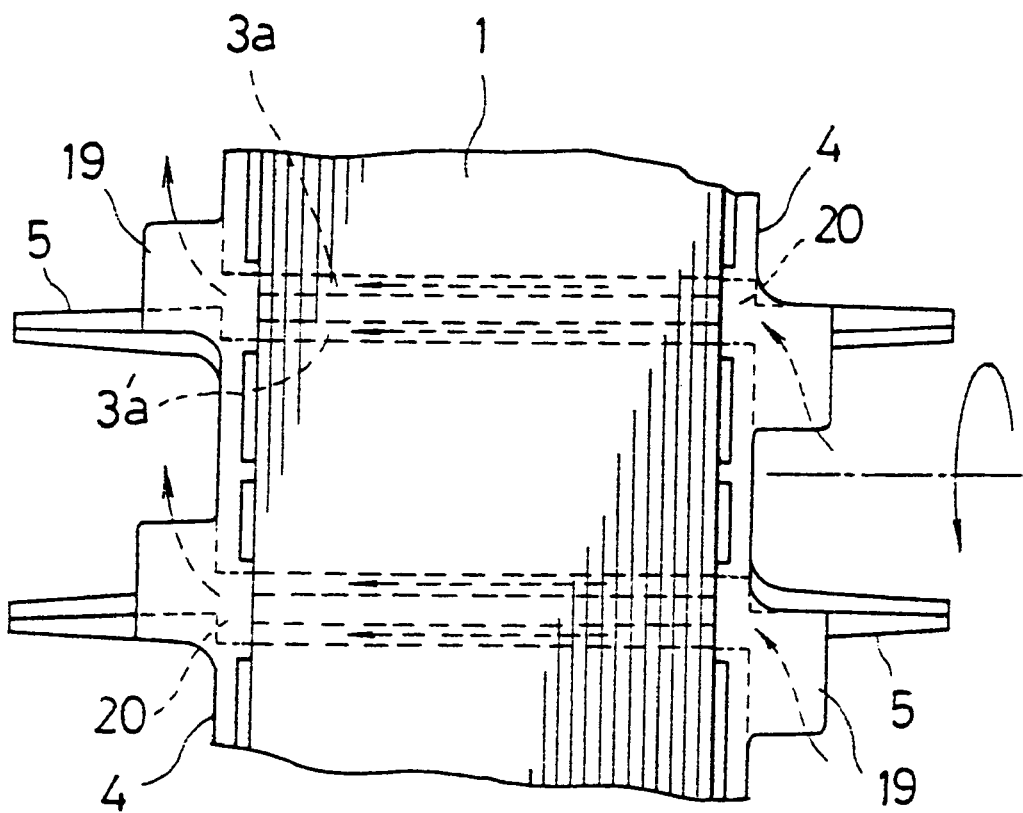
FIG. 18 is an explanation view showing the air flow of FIG. 16.
Figure 19A:
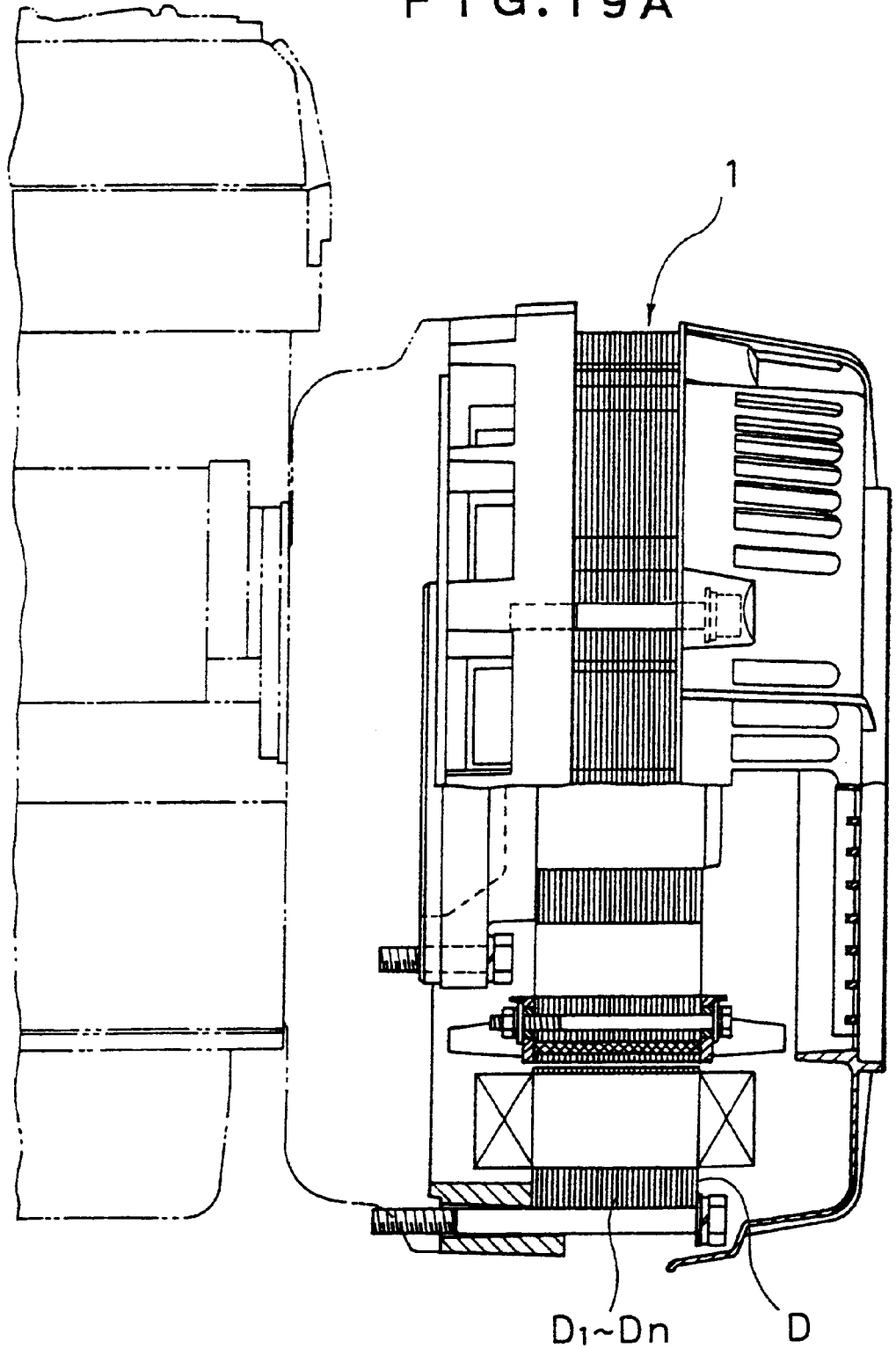
FIG. 19A is a partially sectional side view of a power generator having a lamination of an armature core accommodated therein and FIG. 19B is a front view of an armature.
Figure 19B:
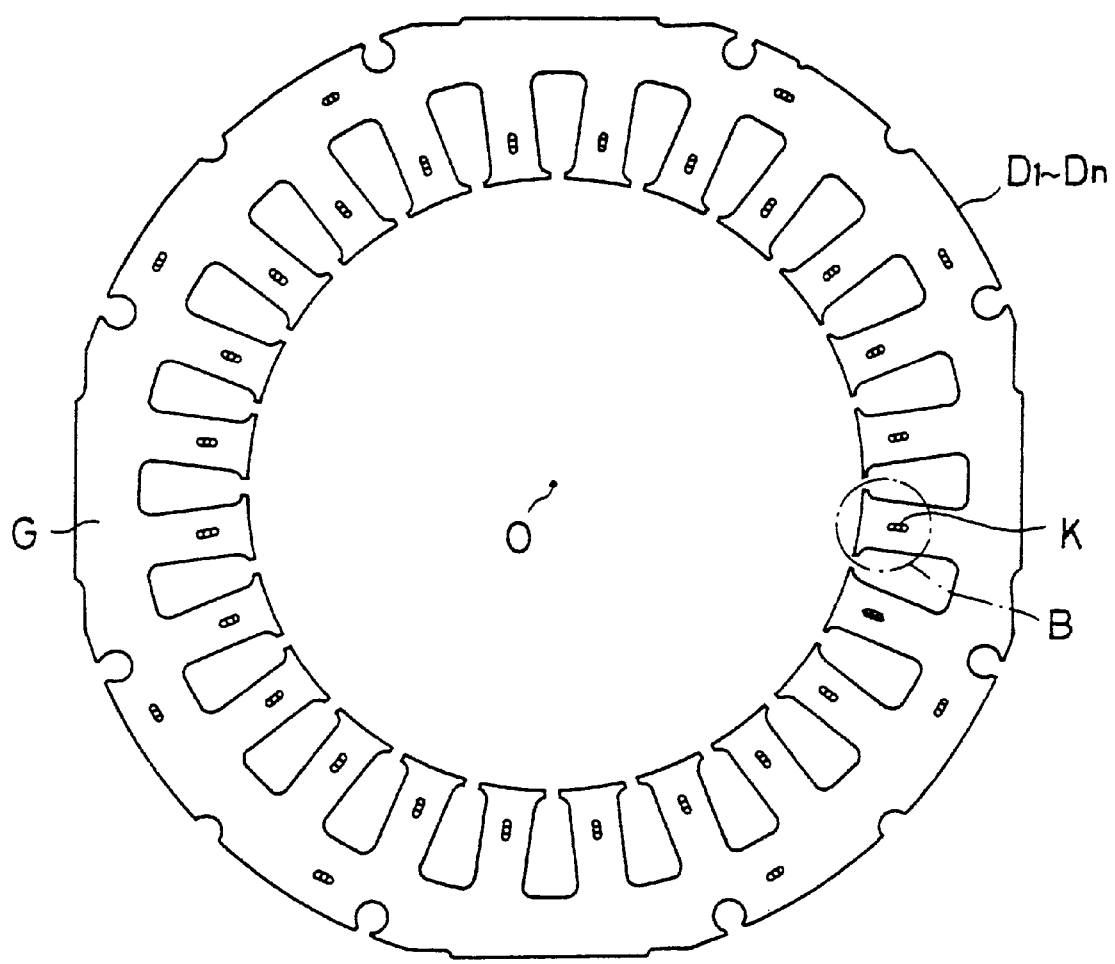

FIG. 1 is a partially cross-sectional side view of a rotor having permanent magnets according to the present invention; FIG. 2 a partially enlarged side view showing the outer frame of the field core for use in a rotor having permanent magnets according to the present invention; FIG. 3 is a perspective view of a rotor having permanent magnets according to the present invention; FIG. 4 is a partially cross-sectional side view of a power generator having a rotor having permanent magnets according to the present invention accommodated therein, wherein the arrows n this Figure show the flow of air; FIG. 5 is a front view of FIG. 4; FIG. 6 is a perspective view of an end plate of the rotor having permanent magnets according to the present invention; FIG. 7 is a plane view of the inside of the end plate of FIG. 6; FIG. 8 is a cross-sectional view of the end plate of FIG. 7, wherein FIG. 8A is a cross-sectional view taken along the line F—F, FIG. 8B is a cross-sectional view taken along the line G—G, and FIG. 8B is a cross-sectional view taken along the line H—H; FIG. 9 is an enlarged cross-sectional view of the rotor having permanent magnets according to the present invention shown in FIG. 1 taken along the line A—A of FIG. 1; FIG. 10 is an enlarged cross-sectional view of the rotor having permanent magnets of FIG. 1 taken along the line C—C of FIG. 1; FIG. 11 is an enlarged cross-sectional view of the rotor having permanent magnets of FIG. 1 taken along the line D—D of FIG. 1; FIG. 13A is an enlarged view shown from the line E, FIG. 13B is a cross-sectional view of FIG. 13A taken along the line I—I, and FIG. 13C is a cross-sectional view of FIG. 13A taken along the line J—J; FIG. 14 is a partially enlarged plane view of the field core for use in the present invention having a non-magnetic substance inserted therein as means for positioning the permanent magnet; FIG. 15 is a plane view of field core sheet for use in the rotor having permanent magnets according to the present invention; FIG. 16 is an external side view of an end plate for use in the rotor having permanent magnets according to the present invention having a baffle provided thereon; FIG. 17 is an internal view of FIG. 16; and FIG. 18 is an explanation view showing the air flow of FIG. 16, wherein the symbols and numerical depicted on these Figures have the flowing meanings:

1: a field core; 1': a field core sheet; 2: a permanent magnet; 3: a storage pore/ a penetrating pore; 3a: an edge portion; 4: an end plate; 5: a wing; 6: a concave groove; 6a: a neighboring projection; 7: a concave portion; 7a: a neighboring projection; 8: a dividing wall; 9: a bolt; 10: a bolt hole; 11: an external cover; 12: an air inlet; 13: an air outlet; 14: a caulking portion; 15: a guide groove; 16: a graduation groove; 17: an armature winding; 18: a non-magnetic substance; 19: a baffle; 20: an air inlet; 21: a gap; 22: a flange; D: an armature; G: an armature sheet; $D_1$-$D_n$: a lamination of armature sheets; 0: an axis core; B: a teeth portion; K: a caulking portion.

In the rotor having permanent magnets in the first aspect of the prevention, since gaps 3a are formed on both ends of the permanent magnets stored in a storage pore of the field core, cooling air flows in the gaps to directly cool the permanent magnet. Consequently, the effect for cooling the permanent magnet can be enhanced.

In addition, since means for positioning a permanent magnet is provided on the storage pore, the uniform balance of the field core can be maintained even at the time of rotating the rotor at a high speed.

Numerical 1 represents a field core having storage pores 3 which are long perforated in adjacent to the outer frame thereof in order to embed rectangle permanent magnets 2. The embodiment shown in the FIG. 16 storage pores 3 are arranged, but the number of the pores are not specifically restricted as long as it is an even number. The interval 1a of the storage pore is narrow so as to reduce the leakage of the magnet flux. A plurality of trapezoid 3a pores are formed on the field core, which allow the passage of cooling air. The field core 1 formed by laminating several field core sheets 1' is clamped by a pair of end plates 4 to be fixed. Wings 14 are projected on the outer frame of each of the end plate 4 at an equivalent interval. Further, on the inner side of each of the end plates, concave grooves 6 which are opened at the core axis side and are closed at the outer circumference side and concave portions which are opened at the outer circumference side and are closed at the core axis side are perforated at a prescribed interval. These concave grooves 6 and concave portions 7 are alternatively placed at an equivalent interval. With regard to the embodiment of alternatively placing them, one possible embodiment as shown in FIG. 7 is that two concave grooves 6 in adjacent to each other are placed and then two concave portions 7 are placed so that every second concave grooves and every second concave portions are placed considering the balance of the field core 1.

Numerical 8 represents dividing walls projected inside of the each end plate 4 at a prescribed interval. The height of the projecting portions 6a around the concave grooves 6, that of the neighboring projecting portions 7a of the concave portions 7, and that of the dividing walls 8 are the same so as to be in contact with the side of the field core 1. In a space made up of the gaps 21 surrounded by the dividing wall 8, and projecting portions 6a and 7a (see FIG. 13A) in contact with the side of the field core 1, the cooling air flows in the direction toward the external armature winding 17 by the virtue of a fan effect due to the internal projecting portions of the end plate 4 such as the neighboring projections 6a of the concave groove 6 and the neighboring projections 7a of the concave portion 7, and the dividing walls 8, and by a centrifugal force (see FIG. 12). The fan effect in this case means that the neighboring projections, the dividing walls, etc. exhibit an effect similar to the fan wing.

Numerical 10 is a bolt pore for inserting a bolt 9 for fixing the field core 1, and has a bush embedded therein. Numerical 11 is an external cover which covers the rotor and has a plurality of air inlets 12 and air outlets 13. Numerical 14 is a caulking portion for communicating field core sheets 1' with each other and several caulking portions are formed on a prescribed portions radial to the core axis. The field core sheet 1' also has guide grooves 15 for lamination guide and graduation groove 16 used when the field core sheet 1' is reversed. A flange 22 is provided on the inner circumference of the end plate 4 extending to the outside.

The rotor having permanent magnets according to the first aspect of the present invention is explained in detail by referring to the drawings.

The storage pores 3 having a substantially rectangle shape are provided in adjacent to the outer frame of the field core 1 at an equivalent interval. In the storage pore 3, the central portion has a longer width and the difference in width is provided at the both ends and the both ends have a smaller width defining an air gap having a trapezoidal shaped edge portion 3a. On the outer circumference portion 3a of the storage pore 3 is formed a shaded portion 3b, which enhances the strength of the field core sheet 1'. The permanent magnet 2 is inserted in the storage pore 3 at the center thereof provided by the laminated field core 1, and the permanent magnet 2 is positioned by the difference in the width. The end portion 3a having the difference is formed. The field core 1 is constructed by laminating these field core sheets 1'. A pair of the end plates 4 clamp the front side and the rear side of the field core 1 in such a manner that the wing 5 resides the external portion, and the bolt 9 is penetrated into the bolt and fixed. In this case, the end plate are adjusted so that opposite to the internal concave groove 6 of the front side end plate the concave portion of the rear side end plate 4 is placed. The end plates 4 clamp and fix both sides of the field core 1 in such manner that a These concave groove 6 and concave portion 7 are faced to the storage pore 3 and the edge portions 3a, 3'a of the storage pore 3 in adjacent thereto and, at the same time, the front side end plate 4 and the rear side end plate 4 side which are formed in the same shape are positioned so that one of them is shifted to one pitch so that the concave groove 6 of the front side end plate 4 is opposite to the concave portion 7 of the rear side end plate 4. As described above, the concave groove 6 and the concave portion 7 of the end plates 4 are communicated with each other via the edge portion 3a of the field core 1 (see FIG. 13).

In the rotor having permanent magnets according to the first aspect of the present invention constructed as described above, when the rotator is rotated, by the virtue of the fan effect due to the rotation of the wing 5 extending to the external side of the end plate, the dividing wall 8 on the internal side, and the neighboring projections 6a and 7a, the cooling air is ventilated from the air inlet 12 of the external cover 11. Part of the cooling air is ventilated from a plurality of trapezoid pores residing at the core axis side. The cooling air ventilated enters the concave groove 6 of the end plate 4, which pushes out the internal air by the configuration force, and the cooling air exit the air outlet on the outer circumference of the concave portion 7. On the other hand, the air flow passing through the gaps 21 surrounded by the dividing wall 8, projections 6a of concave grooves 6 and the projections 7a of the concave portions 7 is brought about (see FIG. 13).

The flow of the cooling air from the air inlet 12 of the external cover 11 is mainly in contact with the surface of the field core 1 by the wing 5 of the end plates 4 and is exhausted to the external side of the armature winding 17 as shown in FIG. 4 and FIG. 9. One part of the cooling air flown from the air inlet 12 of the external cover is exhausted from the concave portion 7 via the concave groove 6, edge portions 3a, 3'a of the neighboring storage pores 3, 3' (see FIG. 10). Another part of the cooling air is spouted from the external concave portion 7 via the concave groove 6 of the internal end plate 4 and storage pores 3, 3' (see FIG. 11). Still another part of the cooling air passes through the gaps 21 (see FIG. 13) divided by the dividing walls 8 of the front and the rear end plates 4, and the neighboring projections 6a and 7a of the concave grooves 6 and the concave portions 7 and flows while being in contact with the side of the field core 1 and the side of the permanent magnet 2 (see FIG. 12).

By the air flow in these ways, the side of the field core 1 and the side of the permanent magnet 2 are directly cooled. For this reason, the rotor having permanent magnets according to the first aspect of the present invention excels in cooling efficiency and can suppress the increase in the temperature thereof. The arrows depicted on FIGS. 9 to 13 express air flow. The mark "⊙" in FIG. 13A shows the direction of the air flow where the air flows from the rear side to the front side of the figure.

The rotor having permanent magnets according to the first aspect of the present invention has the difference in width at both ends of the storage pore 3 in order to position the permanent magnet 2. However, it is also possible to provide no difference in width and instead thereof to insert a non-magnetic substance 18 into the storage pore in such a manner that parts of the spaces of the edge portions are left standing to thereby fix the permanent magnet 2 (see FIG. 14). By inserting the non-magnetic substance 18 as described above, the size of permanent magnetic can be freely selected not depending upon the size of the storage pore 3.

The plurality of caulking portions 14 which are radially provided on the prescribed portions of the field core sheet 1' are fitted to each of the field core sheets 1' and, thus, when the field core sheets 1' are laminated, the caulking portions tightly fix the field core sheets 1' to form the field core. The field core 1 is clamped by the pair of the end plates 4 provided on both ends of the field core 1.

The rotor having permanent magnets according to the first aspect of the present invention has storage pores, into which permanent magnets are inserted, in adjacent to the outer frame of the field core 1 and gaps formed on the edges of the neighboring storage pores are provided. Therefore, the rotor of the present invention can lower the leakage of the magnet flux of the magnetic circuits. Moreover, the construction of the rotor is simplified and can be formed into a small size. This makes it possible to provide a small size power generator having a large output. Furthermore, according to the relation between field core 1 and the pair of the end plates 4 provided on the both ends, the increase in the field core can be suppressed, making it possible to increase the output of the power generator.

The rotor having permanent magnets according to the first aspect of the present invention provides air paths in adjacent to the permanent magnets and the surfaces of the permanent magnets are directly cooled. Therefore, it has an outstanding effect for totally air cooling the rotor. Moreover, since it provides means for positioning the permanent magnet so as to form the air paths on both ends of the permanent magnet, the variation of the position of the permanent magnet during the course of the rotation can be prevented.

In the mechanism for cooling the rotor having permanent magnets according to the second aspect of the present invention, wings are projected on the outer frame of the pair of the end plates, gaps are formed between the inner surface of the end plates and the outer surface of the field core and, at the same time, air paths are formed on both ends of the permanent magnet embedded in the field core. Therefore, as shown in FIG. 4, the cooling air forcedly flows from the air inlet of the external cover, and the cooling air then enters the center of the field core. Part of the cooling air flows from the gaps between the inner surface of the end plates and the outer surface of the field core and the air inlet of the concave groove, passes through the air paths composed of the gaps formed on both end of the storage pores by embedding the permanent magnet into the storage pore (see FIG. 13) to cool the outer surface of the field core and the permanent magnet, and then spouted out from the air outlet via the opposing concave portion of the inner surface of the end plate (rear surface). Therefore, the cooling air can directly cool not only the field core but also the surface of the permanent magnet, suppressing the decrease in output of the power generator.

By exhibiting the effect similar to the wing of the fun (fan effect) due to the rotation of the wing 5 extending to the external side of the end plate, the dividing wall on the internal side, and the neighboring projections, the cooling air is ventilated from the air inlet of the external cover, the cooling air passes through the center of the field core to the gaps, and is then spouted out, improving the efficiency for cooling the side of the field core and the side of the permanent magnet.

The pair of the end plates which are fixed on both ends of the field core alternatively provide the concave grooves and the concave portions on the inner surfaces thereof at an equivalent interval. When one of the end plates is reversed and shifted to one pitch on the axis, they can be fixed in such a state that the concave grooves and the concave portions are opposite to each other. For this reason, both of the end plates can have the same shape, meaning that the end plates can be provided by using the same one mold.

What is more, the cooling mechanism of the rotor having permanent magnets according to the present invention can ventilate much more cooling air within the air paths formed on both ends of the permanent magnet of the field core. The cooling air is incorporated by the baffles projected on the outer frame of the wings of the pair of the end plates, passes through the air path of the permanent magnet, and is spouted out from the ventilator of the opposing end plate. In this case, the cooling efficiency can be further improved.

On the internal circumference of the end plate (around the axis side), a flange can be formed. In this case, the flatness of the end plate can be maintained by the flange, making it possible to tightly clamp the field core.

Numerical 1 represents a field core having tripod penetrating pores 3 which are long perforated in adjacent to the outer frame thereof in order to embed several permanent magnets 2. By laminating several field core sheet 1' and inserting a permanent magnet 2 into the penetrating pore 3, the edge portions 3a and 3'a can be formed. In the field core 1 formed by laminating the field core sheets 1', the cooling air flows in the tripod penetrating pore. Numerical 4 represents a pair of end plates which clamp the field core 1 formed by laminating the field core sheets 1'. The wing 5 are projected on the outer circumference of each of the end plate 4 at an equivalent interval. Further, on the inside of each of the end plates, concave grooves 6 which are opened at the core axis side and are closed at the outer frame side and concave portions which are opened at the outer frame side and are closed at the core axis side are perforated at a prescribed interval. These concave grooves 6 and concave portions 7 are alternatively placed at an equivalent interval. With regard to the embodiment of alternatively placing them, one possible embodiment as shown in FIG. 7 is that two concave grooves 6 in adjacent to each other are placed and then two concave portions 7 are placed so that every second concave grooves and every second concave portions are placed. This number is decided considering the balance of the field core 1.

Numerical 8 represents dividing walls projected inside of the each of the end plate 4 at a prescribed interval. The height of the projecting portions 6a around the concave grooves 8, that of the projecting portions 7a of the concave portions 7, and that of the dividing walls 8 are the same so as to be in contact with the side of the field core 1. In the space made up of the gaps 21 surrounded by the dividing wall 8, and projecting portions 6a and 7a in contact with the side of the field core, the cooling air flows toward the direction of the armature winding 17 by the virtue of a fan effect due to the internal projecting portions of the end plate 4 such as the neighboring projections 6a of the concave groove 6 and the neighboring projections 7a of the concave portion 7, and the dividing walls 8. Numerical 10 is a bolt pore for inserting a bolt 9 for fixing the field core 1 Numerical 11 is an external cover which covers the rotor and has a plurality of air inlets 12 and air outlets 13. Numerical 14 is a caulking portion for communicating field core sheets 1' with each other and several caulking portions are formed on a prescribed portions radial to the core axis. The field core sheet 1' also has guide grooves 15 for lamination guide and graduation groove used when the field core sheet 1' is reversed. A flange 22 is provided on the inner circumference of the end plate 4 extending to the outside.

The mechanism for cooling the rotor having permanent magnets according to the second aspect of the present invention will now be described by referring to the drawings.

In the penetrating pores 3, the central portion has a longer width and the difference in width is provided at the both ends and the both ends have a smaller width so that the permanent magnet to be embedded inwardly is positioned. On both ends of the penetrating pore, the edge portions 3a and 3a are formed. On the outer circumference side of the edge portions 3a and 3a of the penetrating pore 3 is formed a shaded portion 3b, which enhances the strength of the field core sheet 1'. The interval 1a between the penetrating pores 3 and 3' is provided to be narrow. The rectangle permanent magnet 2 is inserted in the penetrating pore 3 at the center thereof which is wide. The shape of the permanent magnet is not specifically restricted. Several field core sheets 1' are laminated along a guide groove 15, and while confirming the position by a graduation groove 16, the several field core sheets 1' are reversed to make up the field core 1. While placing the wing 5 on the out side, the end plates clamp the field core from the front and rear side thereof, a bolt 9 is inserted into a volt pore to be fixed. At this time, the pair of end plates are positioned such that the concave portion 7 of the rear side end plate is opposite to the internal concave groove 6 of the front side end plate 4. To be specific, the internal surfaces of the end plates having the same shape are positioned to be opposite to each other, and one of the end plate is shifted to one pitch (see FIG. 1), after which the end plates 4 clamp the field core 1 to be fixed. These concave grooves 6a and concave portions 7a are opposite to each of the edge portions 3a and 3'a of the penetrating pore 3 and the neighboring penetrating pore 3' (see FIG. 13).

In the mechanism for cooling the rotor having permanent magnets according to the second aspect of the present invention, one concave groove 6 provided on the end plate is opposite to the edge portion 3a of the penetrating pore 3 of the field core and the edge portion 3'a of the neighboring penetrating pore 3'. One concave portion 7 provided on the rear side end plate 4 corresponds to the edge portions 3a and 3'a, the air inlet is opened on the outer frame. This makes it possible to communicate all of the concave grooves 6 and the concave portions 7 of the end plates 4 with each other via the edge portions 3a and 3'a of the field core 1 (see FIG. 13).

Since the mechanism for cooling a rotor having permanent magnets according to the second aspect of the present invention is constructed as described above, when the rotor is rotated, by the virtue of the fan effect due to the rotation of the wing 5 extending to the external side of the end plate 4, the dividing wall 8 on the inside, and the neighboring projections 6a and 7a, the cooling air is ventilated from the air inlet 12 of the external cover 11. Part of the cooling air is ventilated from the core axis side. The cooling air is ventilated in the penetrating paths formed from the tripod pores. One part of the cooling air is ventilated from the core axis side of the rotor, enters the concave groove 6 of the end plate 4, the particles of the internal air, etc. is pushed out by a centrifugal force. They are spouted out from the air outlet of the outer frame side of the concave portion 7 via the edge portions 3a and 3'a of the penetrating pores 3 and 3'. Another part of the cooling air causes the air flow passing through the gaps 21 surrounded by the dividing wall 8, and projecting portions 6a and 7a (see FIG. 12). Consequently, the surface of the permanent magnet can be directly cooled and, what is more, the armature winding 17 residing on outside of the rotor can also be cooled by this air flow.

The flow of the cooling air from the air inlet 12 of the external cover 11 is mainly in contact with the surface of the field core 1 by the wing 5 of the end plates 4 and is exhausted to the external side of the armature winding 14 as shown in FIG. 4 and FIG. 9. On the other hand, one part of the cooling air flown from the air inlet 12 of the external cover is exhausted from the concave portion 7 via the concave groove 6, edge portions 3a, 3'a of the penetrating pores 3, 3' (see FIG. 10). Another part of the cooling air is spouted from the external concave portion 7 via the concave groove 6 of the internal end plate 4 and penetrating pores 3, 3' (see FIG. 11). Still another part of the cooling air passes through the gaps 21 (see FIG. 13) divided by the dividing walls 8 of the front and the rear end plates 4, and the neighboring projections 6a and 7a of the concave grooves 6 and the concave portions 7 and flows while being in contact with the side of the field core 1 and the side of the permanent magnet 2 (see FIG. 12).

By the air flow in these ways, the side of the field core 1 and the side of the permanent magnet 2 are directly cooled. For this reason, the rotor having permanent magnets according to the second aspect of the present invention excels in cooling efficiency and can suppress the increase in the temperature thereof. The arrows depicted on FIGS. 9 to 13 express air flow. The mark "⊙" in FIG. 13A shows the direction of the air flow where the air flows from the rear side to the front side of the figure.

The rotor having permanent magnets according to the second aspect of the present invention has the difference in width at both ends of the penetrating pore 3 in order to position the permanent magnet 2. However, it is also possible to provide no difference in width and to insert a non-magnetic substance 18 into the penetrating pore in such a manner that parts of the spaces of the edge portions are left standing to thereby fix the permanent magnet 2 (see FIG. 14). By inserting the non-magnetic substance 18 as described above, the size of permanent magnetic can be freely selected not depending upon the size of the penetrating pore 3.

As shown in FIG. 16, a baffle 19 projected on the outer frame of the wings 5 of one of the end plates 4 in the direction of the rotation and, at the same time, an air inlet 20 is provided on the lower portion of the baffles 19, i.e., the core axis side. When the pair of the end plates 4 clamp the field core, on the other end plates, the baffle 19 is projected in the counter direction of the rotation.

When the rotor having permanent magnets constructed as described above is rotated, the cooling air is ventilated from the air inlet 20 by the baffle 19 of the wing 5, passes through the neighboring edge portions 3a and 3'a which form the air paths of the permanent magnet 4, and is spouted out from the opposing air inlet 20 (see FIG. 18). Such an air flow directly cools the sides of the field core 1 and the permanent magnet, improving the cooling efficiency.

As shown in FIG. 16, the baffles 19 are projected in the direction of the rotation on the each of wings 5 of the end plates, the cooling air is ventilated in one direction and flows to the reverse direction. The air inlet 20 is provided in adjacent to the baffle 19 somewhat far from the wing 5 due to the reason of the strength of the wing 5.

In the rotor having permanent magnets according to this aspect, even when the dividing walls between the field core and the pair of the end plates, the concave grooves and the concave portions are provided at the same height and at some intervals, the field core laminated is tightly fixed and the positioning of the permanent magnet in the axis direction can be made.

In the mechanism for cooling the rotor having permanent magnets according to the second aspect of the present invention, the cooling air flows in contact with the field core and, in particular, flows directly in contact with the embedded permanent magnet. It is, therefore, possible to cool not only the field core but also the permanent magnet. Consequently, the increase in temperature due to the radiation heat from the armature winding can be suppressed, making it possible to suppress the decrease in the output of the power generator.

Moreover, the end plates having the same shape can be used on both sides, the combination of the end plates are easy and the end plates can be provided only by one mold.

What is claimed is:

1. A rotor having permanent magnets formed by laminating a plurality of permanent magnets embedded in storage pores, comprising each permanent magnet inserted in each of said storage pores so as to form gaps 3a,b at both ends of the storage pore of the field core, said gaps having a trapezoidal shaped edge portion thereby to form air paths for cooling air and a space 1a between the storage pores 3 formed to be narrow 1a so as to reduce leakage of magnetic flux between each storage pore.

2. The rotor as claimed in claim 1, wherein said storage pores formed in adjacent to the outer frame is formed as long pores, rectangle permanent magnets are embedded into each of the pores at the center portion thereof, and means for positioning the permanent magnets are placed in the gaps formed on the both ends of each pores.

3. The rotor as claimed in claim 2, wherein said means for positioning the permanent magnet is formed so that both ends thereof are longer than the middle portion to place difference in shape of the storage pores.

4. The rotor as claimed in claim 2, wherein said means for positioning the permanent magnet position the permanent magnet is formed by embedding a non-magnetic substance into part of the gaps.

5. A mechanism for cooling a rotor having permanent magnets formed by laminating a plurality of field core sheets to form a field core, embedding a plurality of permanent magnets into the field core, and fixing the field core by means of a pair of end plates having a plurality of wings on the outer surface thereof so as to generate the flow of cooling air toward the armature winding, comprising air paths for cooling air formed by providing gaps between each of the inner surface of the end plate and the outer surface of the field core, and air paths for cooling air also formed by placing air paths in the axis direction in contact with each of the permanent magnets on both ends of the permanent magnet, and placing an inlet and an outlet of the cooling air on each of said air paths in such a manner that the cooling air enters one end plate and exits the other end plate via each of said air paths.

6. A mechanism for cooling a rotor having permanent magnets as claimed in claim 5, wherein concave grooves each having an air inlet in which an outer frame side is closed and an axis core side is opened, and concave portions each having an air outlet in which an axis core side is closed and an outer frame side is opened are alternatively placed on the inner surface of the outer edge of the end plates, a concave portion on one end plate is position opposite to a concave groove on the other end plate so as to clamp the said field core and, at the same time, the air paths formed on both ends of the permanent magnets perforated into the field core is fixed by said pair of the end plates on both sides of the field core opposite to the concave portion and the concave groove of the said pair of the end plates, and according to the rotation of the rotor, by means of a fan effect caused by the outside wing, the projected portions around said concave grooves and the projected portions around said concave portions formed radially, the cooling air is spouted through the gaps formed between the inner surface of the end plate and the outer surface of the field core and, at the same time, the cooling air is inflated from said concave groove, then it passes through the air paths, and is spouted at the concave portion opposite to the corresponding concave groove.

7. A mechanism for cooling a rotor having permanent magnets as claimed in claim 6, wherein a plurality of dividing walls are provided on the portions between the concave grooves and the concave portions or the inlets of the end plates in such a manner that the height of the dividing wall is the same as the neighboring projections of the concave grooves and concave portions so that when the pair of the end plates clamp both sides of the field core, gaps are formed between the end plates and the outside of the field core in contact with the end plate, whereby the cooling air is spouted from the gaps according to the rotation of the rotor.

8. A mechanism for cooling a rotor having permanent magnets formed by laminating a plurality of field core sheets to form a field core, embedding a plurality of permanent magnets into the field core, and fixing the field core by means of a pair of end plates having a plurality of wings on the outer surface thereof so as to generate the flow of cooling air toward the armature winding, comprising baffles provided on the outer frame of the plurality of wings projected on the outer surface of the pair of end plates at an equivalent interval, in such a manner that the baffle on one end plate is provided in the direction of the rotation and the baffle on the other end plate is provided in the direction opposite to the rotation, air paths provided in adjacent to the baffle on the axis side in such a manner that the positions of said air paths are accorded with the air paths residing on both ends of the pores into which the permanent magnet is embedded, whereby the cooling air inflated from the air paths on the axis core side is passed through the air paths at both ends of the permanent magnet by means of the baffle of the edge extending to the direction of the rotation according to the rotation of the rotor and flows to the opposite ventilator to cool the field core and the permanent magnet.

* * * * *